US009161005B2

(12) United States Patent
Rose et al.

(10) Patent No.: US 9,161,005 B2
(45) Date of Patent: Oct. 13, 2015

(54) METHOD AND APPARATUS FOR ACQUIRING STORAGE FOR MEDIA ASSETS

(75) Inventors: James Manuel Rose, San Francisco, CA (US); Joel Fogelson, New Jersey, CA (US)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 13/989,359

(22) PCT Filed: Dec. 8, 2010

(86) PCT No.: PCT/US2010/003121
§ 371 (c)(1),
(2), (4) Date: May 23, 2013

(87) PCT Pub. No.: WO2012/078125
PCT Pub. Date: Jun. 14, 2012

(65) Prior Publication Data
US 2013/0243404 A1 Sep. 19, 2013

(51) Int. Cl.
| H04N 5/78 | (2006.01) |
| H04N 9/79 | (2006.01) |
| H04N 5/445 | (2011.01) |
| H04N 21/432 | (2011.01) |
| H04N 21/433 | (2011.01) |
| H04N 21/4335 | (2011.01) |
| H04N 21/472 | (2011.01) |
| H04N 21/482 | (2011.01) |

(52) U.S. Cl.
CPC ............ *H04N 9/79* (2013.01); *H04N 5/44543* (2013.01); *H04N 21/4325* (2013.01); *H04N 21/4331* (2013.01); *H04N 21/4335* (2013.01); *H04N 21/47214* (2013.01); *H04N 21/4821* (2013.01)

(58) Field of Classification Search
None
See application file for complete search history.

(56) References Cited

U.S. PATENT DOCUMENTS

| 7,394,967 | B1 | 7/2008 | Potrebic et al. |
| 7,542,999 | B2 | 6/2009 | Kamath et al. |
| 2004/0111756 | A1 | 6/2004 | Stuckman et al. |
| 2005/0050578 | A1 | 3/2005 | Ryal |
| 2008/0005204 | A1 | 1/2008 | Prus et al. |
| 2009/0037964 | A1* | 2/2009 | Murray et al. ................... 725/92 |
| 2012/0159534 | A1* | 6/2012 | Quan et al. ....................... 725/31 |
| 2012/0191807 | A1* | 7/2012 | Kikinis .......................... 709/217 |
| 2013/0283312 | A1* | 10/2013 | Liwerant et al. ................. 725/32 |
| 2014/0037270 | A1* | 2/2014 | Craner .......................... 386/295 |

FOREIGN PATENT DOCUMENTS

EP  1292143  3/2003

* cited by examiner

*Primary Examiner* — William C Vaughn, Jr.
*Assistant Examiner* — Eileen Adams
(74) *Attorney, Agent, or Firm* — Vincent E. Duffy; Joel M. Fogelson

(57) ABSTRACT

Management of the storage of media assets as between one of a plurality of content selection device ($12_1$-$12_3$) and a network storage facility (24) occurs in accordance with a user-assigned earliest viewing time assigned to the assets. To provide a user with the highest quality viewing experience, the network storage facility will down load to the requesting content selection device the requested media asset in advance of its earliest desired viewing time. To the extent that the content selection device lacks available storage capacity, then the content selection device will upload one or more media assets based on the earliest desired viewing time to off-load assets desired for viewing at a time later than the requested content.

16 Claims, 3 Drawing Sheets

METHOD AND APPARATUS FOR ACQUIRING STORAGE FOR MEDIA ASSETS

This application claims the benefit, under 35 U.S.C. §365 of International Application PCT/US10/003121, filed Dec. 8, 2010 which was published in accordance with PCT Article 21(2) on Jun. 14, 2012 in English.

TECHNICAL FIELD

This invention relates to storage of media assets in devices for transfer therebetween.

BACKGROUND ART

Today, users can acquire media assets, such as movies, music, or videos, from a variety of content providers including, but not limited to a service such as ITunes or Amazon. Typically, a user will first select a desired media asset, say a movie, and thereafter make appropriate arrangements for payment. After receiving payment, the content provider will download the selected media asset to the user's computer or other media selection device, such as a set-top box or the like for consumption. Users who subscribe to media assets in the form of television content from a cable television provider often have the opportunity to download media assets to their set-top box or external asset storage device (e.g., digital video recorder) for subsequent viewing at a later time.

Regardless of how and where a user obtains media assets, finite limits exist on locally available storage capacity regardless of the type of storage device (set-top box, computer, personal video recorder, etc.) To obtain additionally storage capacity for media assets, a user has several options. First, a user could simply delete one or more previously stored media assets to free up additional storage space. However, some users do not want delete anything, eventually leading to a lack of storage capacity as the user acquires more media assets ( To obtain additional capacity, a user could take advantage of remote storage for media assets as currently offered by different providers who typically maintain large groups of server, typically referred to as "server farms." A user desirous of acquiring such remote storage would make arrangements with such a service provider to rent a set amount of space (5 GB, 10 GB, 15 GB, etc.) for storing new media assets. A user seeking to acquire a new media asset could simply direct the provider of that asset to send it to the user's remote storage site, such as by providing the associated Uniform Resource Locator (URL) associated with the remote storage site. Alternatively, the user could transfer media assets currently stored on a local storage device (e.g., a set top box) to the remote storage facility so that the set-top box can now store newly acquired media assets. The storage of media assets among local and remote sites can present difficulties. Typically, a user will enjoy a better viewing experience upon playback of locally stored media as compared to the playback of media assets streamed to the user's content selection device using programs like Flash, RealPlayer, or Windows Media Player.

There currently exist techniques for managing the transfer of media assets between remote and local storage devices. Most techniques rely on criterion such as viewing frequency so that more popular media assets remain locally stored whereas less frequently viewed media assets get stored remotely. Unfortunately, such techniques do not always insure that a media asset selected for subsequent viewing will reside in the local storage device at the earliest desired time of viewing.

Thus a need exists for an improved technique for managing content storage.

BRIEF SUMMARY OF THE INVENTION

Briefly, in accordance with one aspect of the present principles, a method for a method for managing the storage of media assets commences by assigning to each stored media asset a user-determined earliest desired viewing time. Thereafter, at least one media asset is transferred between a local storage device and a remote storage device responsive to the user-selected earliest desired viewing time. In this way, the user can enjoy a high quality viewing experience by viewing the at least one media asset from the local storage device.

In accordance with another aspect of the invention, a content selection device advantageously will alert a user of the need for additional storage capacity once the existing storage capacity reaches a certain threshold. Upon receiving such an alert, the user can indicate his or her desire to acquire more storage capacity, whereupon the content selection device can notify network service operator to provide more storage capacity. In some instances, a user can obtain more local storage capacity by receiving from the network service operator a different set-top box with a larger hard drive. Alternatively, the network service operator could provide the user an external storage device (e.g., a hard drive) chained to the existing set-top box. As another alternative, the network service operator could make arrangements with network storage facility on behalf of the user. In this way, the necessary arrangements to obtain more storage capacity would occur automatically.

DETAILED DESCRIPTION

Figure 1:
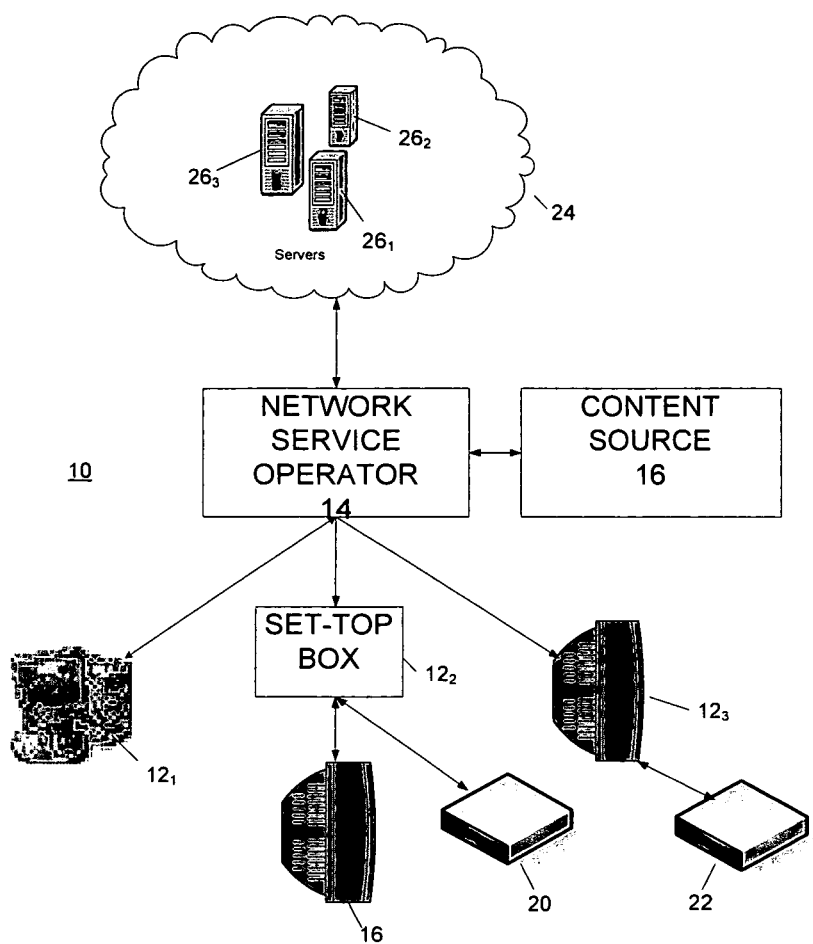
FIG. 1 depicts a block schematic diagram of a system for practicing the present principles.

FIG. 1 depicts a block schematic diagram of a system 10 in accordance with a preferred embodiment of the present principles for enabling a user to better manage the storage of media assets, such as movies, video programs and the like. The system 10 includes a plurality of content selection devices, exemplified by devices $12_1$, $12_2$ and $12_3$, for obtaining media assets from a network service operator 14, who would obtain such assets from a content source 16. The network service operator 14 can comprise a provider of cable television services, a telecommunication service provider or the like.

In practice, the content selection device $12_1$ can comprise a personal computer, whereas content selection device $12_2$ can comprises a set-top box connected to a television set 18, while content selection device $12_3$ can comprise a television set having a cable card (not shown). Regardless of the type of content selection device, the ability of that device to store content remains limited. The particular nature of the content selection devices $12_1$-$12_3$ does not affect managing the storage of media assets in accordance with the present principles.

To store more media assets, the user of the content selection device will need to add more storage capacity. For example, the user of the personal computer $12_1$ could increase the size of the internal hard drive, or alternatively, one or more additional hard drives (not shown). For example, in the case of the set-top box $12_2$ or the television set $12_3$, the user could add a separate one of hard drives 20 and 22, respectively. As an alternative to adding more local storage, a user of one of the content selection devices $12_1$-$12_3$ could make arrangements to obtain storage capacity at a network storage facility 24 (i.e., a server farm) comprised of a plurality of servers, e.g., servers $26_1$-$26_3$. As described in greater detail hereinafter with respect to FIG. 3, in accordance with one aspect of the present principles, the content selection device will automatically monitor available storage capacity. When the available storage capacity decreases below a threshold value, the content selection device would prompt the user whether he or she wants to acquire additional storage capacity, either greater local storage capacity or remote storage capacity. In response to a user request seeking additional storage capacity, the content selection device would notify the network service operator 14 to make the necessary arrangements to provide more local or remote storage capacity. In the event that the user wants to acquire network storage capacity, the network service operator 14 would make arrangements with the network storage facility 24. Thereafter, a content selection device user would make a request to the network service operator 14 for one or more media assets and request downloading of the requested media asset(s) directly to one of the servers $26_1$-$26_3$ within the network storage facility 24.

The network storage facility 24 could retain some or all the media assets depending on circumstances. For example, if no available storage capacity exists on the user's content selection device, then the storage facility 24 would retain the media assets. Each time a user wanted to view a particular media asset, the user would make a request to the network storage facility 24. The particular one of the servers $26_1$-$26_3$ in the network storage facility 24 storing the requested media asset would then stream the media asset to the user's content selection device in real time. Unfortunately, streaming the requested media asset to the user's content selection device in real time does not afford the same high quality viewing experience as if the media asset were stored locally.

While local storage of media assets remains preferable, problems can arise regarding transfer of the media asset to the content selection device in advance of viewing. Obviously, if the content selection device remains "full" (i.e., no storage capacity currently exists), then one or more media assets must be deleted or transferred to make space available for newly requested assets. In the past, deletion and/or transfer of media assets depended upon viewing frequency. In other words, media assets viewed less would get deleted or transferred before those media assets view more often. Unfortunately, this approach does not take into account a spur-of-the moment decision of a user to now view a media asset categorized as infrequently viewed.

Therefore a need exists for a media asset management storage technique that maximizes the user viewing experience by assuring that the content selection device possesses the media assets in advance of the earliest desired time of viewing In accordance with the present principles, media assets stored locally on a content selection device and stored remotely on a network storage facility 24 are exchanged depending on the desired viewing times of the assets and the storage capacity of the content selection device. In advance of its desired viewing time, a media asset stored at the network storage facility gets downloaded to the content selection device to assure high quality playback. If the content selection device lacks capacity to receive such a media asset from the network storage facility, one or more media assets stored on the content selection device having a later desired viewing time get uploaded to the network storage facility.

The exchange of media assets between the content selection device and the network storage facility 24 can best be understood from the following example. Assume a user has stored media assets in the form of movies and game shows, some of which reside on the user's content selection device and others of which reside at the network storage facility. Further assume that the user wishes to view one or more selected movies on Friday evening and view one more game shows on a succeeding Sunday morning. A movie, desired for viewing on Friday evening and residing at the network storage facility 24, gets downloaded to the content selection device in advanced of the desired viewing time.

If the content selection device lacks capacity, then media assets stored on the content selection device which a later desired viewing time (as compared to the earliest desired viewing time of the media asset at the remote storage facility) get uploaded to the network storage facility. Thus, if the only assets stored locally on the content selection device comprise movies with Friday night viewing times, and game shows with desired viewing times during the succeeding Sunday morning, then one or more of the game shows get uploaded to the network storage facility 24. After Friday evening, but before Sunday morning, the network storage facility will download the previously uploaded game shows. If the content selection device lacks storage capacity, the previously downloaded movies get uploaded from the content selection device to the network storage facility.

Figure 2:
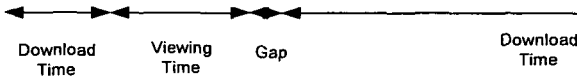
FIG. 2 depicts an electronic program guide of a set-top of FIG. 1 depicting the media assets transferred to and from the set-top box depending on the assigned viewing time.

To alert the user as to the location and status of stored media assets, the content selection device, for example the set-top box $12_2$ includes a display generator (not shown) for generating an electronic program guide 200 of the type illustrated in FIG. 2. The program guide 200 depicts media assets in the form of television programs in a conventional grid array of rows and columns. The columns correspond to different time times, and the rows correspond to different program sources. In the exemplary embodiment of FIG. 2, the columns of the program guide 200 depict one-half hour increments beginning with 8:00 PM and ending with 10:30 PM. The top three rows of the program guide 200 correspond to media assets (i.e., television programs) available from the three television networks NBC, CBS and ABC, respectively. Although not shown in FIG. 2, other content sources could provide media assets, such as HBO, Showtime, Cinemax, The Discovery Channel, TBS, TNT, Hallmark, the Food Channel and the like. The media assets provided from the three television networks NBC, CBS, and ABC listed in the first three rows of the program guide 200 of FIG. 2 have fixed viewing times. In other words, a user can only view a media asset at the particular time(s) that content source makes that media asset available.

The second from bottom row of the program guide 200 of FIG. 2 lists the status of media assets locally stored on the content selection device (e.g., set-top box $12_1$ of FIG. 1), while the last row lists the status of media assets stored remotely at the network storage facility 24 of FIG. 1. In contrast to the media assets provided by the three television networks NBC, CBS, and ABC depicted in FIG. 1, the media assets stored locally on the content selection device and at the network storage facility 24 of FIG. 1 remain available for viewing at any time so long as the media asset remains stored. Thus, the association of an earliest desired viewing time with each stored media asset might seem anomalous since the user can a stored media asset at any time. However, the importance of assigning an earliest desired viewing time to stored assets plays an important role in connection with managing the storage of media assets on the content storage device and at network storage facility.

As discussed above, to assure that the user enjoys a high quality viewing experience, the media asset desired for viewing should reside on the user's content selection device, for example set-top box $12_2$ in advance of the earliest desired viewing time. To make sure that the network storage facility 24 can download the desired media asset(s) to the content selection device in advance of viewing, the user will assign an earliest desired viewing time to the media assets stored at the network storage facility 24 of FIG. 1. The network storage facility 24 will thus take into account both the earliest desired viewing time of the media asset, as well as the required time for downloading when scheduling downloading of media assets to the content storage device. One approach for determining the estimated amount of the time it will take for a media asset to be download to device takes the size of the media asset and divides the size by the network bandwidth speed (as calculated between servers 26 and set top box $12_2$, for example). Other approaches can be used to determine the estimated time of transmission, as well.

Media assets stored on the content selection device, such as the set-top box $12_2$ will also have a user-assigned earliest desired viewing time as well. However, having the user assign an earliest desired viewing time to the media assets stored in the content selection device affords the ability to exchange assets between the network storage facility 24 and the content selection device. By knowing the earliest desired viewing time for its stored media assets, the content selection device can off load media assets with a later desired viewing time to the network storage device to receive therefrom media assets having an earlier desired viewing time.

The exchange of media assets between the content selection device and the network storage facility 24 can best be understood by reference to the last two rows in the electronic program guide 200. As depicted in FIG. 2, the boxes in the second last row of the program guide 200 represent at least some of the stored media assets arranged in a user-selected viewing order which could correspond to the earliest desired viewing time but need not do so. As long as the earliest assigned viewing time for each of the depicted media assets remains no later than the user-selected scheduled viewing time, then the user can view the media asset at the desired time. The displayed media assets in the boxes in the second last row of the electronic media guide 200 of FIG. 2 include not only the identification of the asset, but the legends "HQ" and "Now." The legend "HQ" indicates that the view will obtain a high-quality viewing experience because the media asset will resides on the content selection at the time of scheduled viewing. (The legend "HQ should not be confused with the acronym HD which signifies that the media asset appears in high definition. The term "now" signifies that the media asset is available for immediate viewing.

By way of example, the two boxes in the second-last row of the program guide 200 of FIG. 2 residing in the columns "8:00 PM" and "8:30 PM" depict the media assets "Seinfeld" and "Cheers", available for viewing. These two boxes also depict the media assets "NCIS" and "Hawaii 50", respectively, with shading. The shading indicates that these media assets are being uploaded from the content selection device to the network storage facility 24 of FIG. 1 during the corresponding time interval to make room for future media assets.

As discussed, the last row of the electronic program guide 200 of FIG. 2 depicts the status of media assets stored at the network storage facility 24 of FIG. 1. The box in the last row residing in the column "8:00 PM" indicates that a media asset identified by the legend "News" is currently undergoing downloading during a download time as indicated below the box. After downloading, that media asset remains available for viewing. After a short gap time, the media assets, each identified by the legend "Game Show", and appearing in the boxes lying in the columns "9:00 PM", "9:30 PM", "10:00 PM" and "10:30 PM" then undergo downloading, as indicated by the shading in FIG. In this manner, the electronic program guide 200 of FIG. 2 advantageously provides a display of the status of assets stored on the content selection device and on the network storage facility 24.

An optional feature provides that when storing media assets to remote servers $26_{1-3}$, a user can be provided with an option to buy a physical storage medium, whereby the media assets stored at the remote servers $26_{1-3}$ can be stored on the physical storage medium. The physical storage medium can then be physically sent to a user who requested the archival of such media assets to the medium. That is, using the user guide as presented in FIG. 2, a generated message prompts a user whether or not the assets that are to be stored to servers $26_{1-3}$, should also be archived to a physical storage medium. The user can then have the option of purchasing such a physical storage medium for a particular price.

This optional feature can be expanded where the prompted message can also make a recommendation as to how much storage a user should buy for the physical storage medium. For instance, set top box $12_2$ determines that a user has only 5 GB of space free on a hard drive within the set top box. Set top box $12_2$ also can determine from information from servers $26_{1-3}$, in the EPG, and/or within itself that a user has 45 GB of media assets stored on servers $26_{1-3}$. Set top box $12_2$ can then make a recommendation for a user that they purchase a 100 GB hard drive with the option of having the 45 GB of media assets being archived to the hard drive.

The recommendation of the hard drive being suggestion can depend on variations of free space on the local hard drive in set top box $12_2$ and the amount of storage required for the media assets stored on servers $26_{1-3}$. That is, the size of the hard drive being suggested will be bigger if the size of the media assets being archived is large (100 GB), while the size of the hard drive being suggested will be smaller if the size of the media assets being archived is small (1 GB).

Also when making this recommendation, the suggestion considers the free space of a local drive: If a user has more free space (20 GB) on their local hard drive, the size of a recommended hard drive can be smaller (50 GB instead of 100 GB). Likewise, if the amount of free space on the hard drive is small (2 GB), a hard drive with a bigger size is suggested 150 GB. The suggestion of a storage medium can also change from being a high capacity storage medium (hard drive) to a lower capacity storage medium (Blu-Ray, DVD, USB memory stick) depending on the required storage space.

A second approach for considering the suggestion of a storage medium, a device such as set top box $12_2$ can makes a suggestion when the time of transmission for media assets exceeds a determined threshold. For example, if the total time of transmission of media assets from servers $26_{1-3}$ to set top box $12_2$ exceeds a time such as 10 hours, set top box $12_2$ can suggest that a user have such media assets archived to a physical storage medium that is delivered to a user physically. This threshold can vary based on criteria specified by a network operator 14, or a user operating a device such as set top box $12_2$. Such an option can also be suggested if a user is payment plan an option which requires the user to pay for the transmission of content on a MB or GB basis, where it can be more economical to have content physically delivered on a storage medium instead of having such content transmitted from a server 26₁ to a set top box 12₂.

Figure 3:
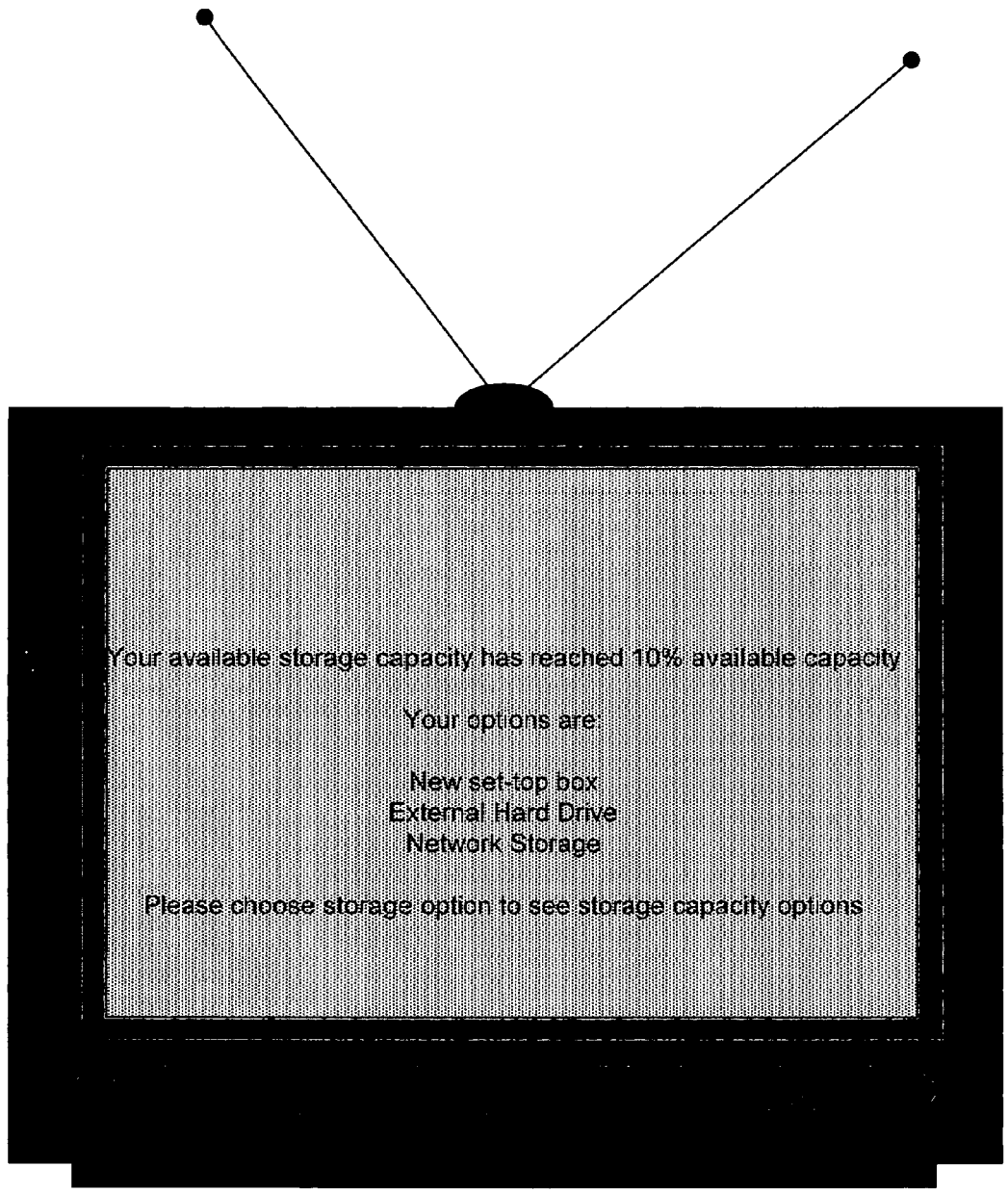
FIG. 3 depicts a screen display generated by a content selection device of the system of FIG. 1 to alert the user of a need to acquire more storage capacity.

FIG. 3 depicts an exemplary message generated by a content selection device for display to the user to alert the user of the need for more storage capacity and available choices. As discussed above, the message will typically prompt the use to choose among various options including either local or remote storage, or the amount of storage capacity available.

The foregoing describes a technique for managing the storage of media assets between a content selection device and a network storage facility.

The invention claimed is:

1. A method for managing the storage of media assets, comprising:
   an operation of transferring at least one media asset for local storage in advance of a user-assigned earliest desired viewing time for that at least one media asset;
   prior to the transferring operation, transferring at least a second media asset from local storage to remote storage, the at least a second media asset being transferred from local storage to remote storage having a user-assigned earliest desired viewing time that is later than the user-assigned earliest desired viewing time of the media asset transferred for local storage, wherein the operation of transferring the at least a second media asset from local storage to remote storage occurs only if the local storage lacks the sufficient capacity;
   determining if the local storage lacks sufficient capacity to store the at least one media asset; and
   in the event the local storage lacks the sufficient capacity, storing the at least one media asset on the remote storage.

2. The method according to claim 1, further comprising providing a program guide, for display, indicating the status of local storage of media assets.

3. The method according to claim 2, wherein the providing a program guide for display indicates the status of remotely stored media assets.

4. The method according to claim 1, wherein the user-assigned earliest desired viewing time is different than a time at which the media asset is transferred to local storage.

5. A content delivery system, comprising:
   at least one content selection device for local storage of media assets; and
   at least one network storage facility for remote storage of media assets; wherein
   the network storage facility transfers at least one media asset to the content selection device in advance of a user-assigned earliest desired viewing time of the at least one asset;
   the at least one content selection device, in advance of transfer of the at least one media asset from the network storage facility, transfers to the remote storage facility at least a second media asset having a user-assigned earliest desired viewing time that is later than the user-assigned earliest desired viewing time of the at least one media asset, wherein the operation of the at least a second media asset is transferred from local storage to remote storage only if the local storage lacks the sufficient capacity;
   determine if the local storage lacks sufficient capacity to store the at least one media asset; and
   in the event the local storage lacks the sufficient capacity, instruct storing the at least one media asset on the remote storage.

6. The system according to claim 5, wherein the at least one content selection device includes means for generating an electronic program guide indicating at least one status of local storage of media assets.

7. The system according to claim 6 wherein the electronic program guide indicates statuses of media assets stored on the network storage facility.

8. The system according to claim 5, wherein the user-assigned earliest desired viewing time is different than a time at which the media asset is transferred to local storage.

9. A method for managing the storage of media assets, comprising:
   an operation of transferring at least one media asset for local storage in advance of a user-assigned earliest desired viewing time for that at least one media asset;
   prior to the transferring operation, transferring at least a second media asset from local storage to remote storage, the at least a second media asset being transferred from local storage to remote storage having a user-assigned earliest desired viewing time that is later than the user-assigned earliest desired viewing time of the media asset transferred for local storage;
   determining an estimated time necessary for transferring the at least one media asset to local storage; and
   initiating transferring the at least one media asset at a time preceding the user-assigned earliest desired viewing time by at least the estimated time.

10. The method according to claim 9, wherein the user-assigned earliest desired viewing time is different than a time at which the media asset is transferred to local storage.

11. A content delivery system, comprising:
    at least one content selection device for local storage of media assets; and
    at least one network storage facility for remote storage of media assets; wherein
    the network storage facility transfers at least one media asset to the content selection device in advance of a user-assigned earliest desired viewing time of the at least one asset;
    the at least one content selection device, in advance of transfer of the at least one media asset from the network storage facility, transfers to the remote storage facility at least a second media asset having a user-assigned earliest desired viewing time that is later than the user-assigned earliest desired viewing time of the at least one media asset,
    determine an estimated time necessary for transferring the at least one media asset to local storage; and
    initiate transferring the at least one media asset at a time preceding the user-assigned earliest desired viewing time by at least the estimated time.

12. The method according to claim 9, further comprising providing a program guide, for display, indicating the status of local storage of media assets.

13. The method according to claim 12, wherein the providing a program guide for display indicates the status of remotely stored media assets.

14. The system according to claim 11, wherein the at least one content selection device includes means for generating an electronic program guide indicating at least one status of local storage of media assets.

15. The system according to claim 14 wherein the electronic program guide indicates statuses of media assets stored on the network storage facility.

16. The system according to claim 11, wherein the user-assigned earliest desired viewing time is different than a time at which the media asset is transferred to local storage.

\* \* \* \* \*